(12) United States Patent
Park et al.

(10) Patent No.: US 9,645,960 B2
(45) Date of Patent: May 9, 2017

(54) KVM SWITCH

(71) Applicant: FUJITSU COMPONENT LIMITED, Tokyo (JP)

(72) Inventors: Jinsoo Park, Tokyo (JP); Ryohei Okada, Tokyo (JP); Masanobu Hayama, Tokyo (JP); Naoki Ishii, Tokyo (JP); Kazuhiro Yasuno, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 22 days.

(21) Appl. No.: 14/849,925

(22) Filed: Sep. 10, 2015

(65) Prior Publication Data
US 2016/0117276 A1   Apr. 28, 2016

(30) Foreign Application Priority Data

Oct. 28, 2014   (JP) .................................. 2014-219621

(51) Int. Cl.
| | |
|---|---|
| G06F 13/00 | (2006.01) |
| G06F 13/38 | (2006.01) |
| G06F 13/40 | (2006.01) |
| G06F 11/20 | (2006.01) |
| G06F 3/02 | (2006.01) |

(52) U.S. Cl.
CPC ........ G06F 13/385 (2013.01); G06F 13/4022 (2013.01); G06F 3/02 (2013.01); G06F 11/20 (2013.01)

(58) Field of Classification Search
CPC .......... G06F 3/02; G06F 3/0234; G06F 11/20; G06F 13/385; G06F 13/4022

USPC ................................ 710/63, 100, 316, 317
See application file for complete search history.

(56) References Cited

U.S. PATENT DOCUMENTS

| | | | | | |
|---|---|---|---|---|---|
| 4,729,097 | A | * | 3/1988 | Takaoka ................ | G06Q 20/20 705/16 |
| 5,235,328 | A | * | 8/1993 | Kurita .................. | H03J 1/0025 340/12.28 |
| 2004/0024964 | A1 | * | 2/2004 | Taninaka ............... | H04L 49/65 711/114 |

(Continued)

FOREIGN PATENT DOCUMENTS

JP   2005-18135   1/2005

OTHER PUBLICATIONS

Patent Abstracts of Japan, Publication No. 2005-18135, published Jan. 20, 2005.

*Primary Examiner* — Farley Abad
*Assistant Examiner* — Getente A Yimer
(74) *Attorney, Agent, or Firm* — Staas & Halsey LLP

(57) ABSTRACT

A KVM (K: keyboard, V: video, M: mouse) switch to be connected between a computer, and a keyboard and a mouse, the KVM switch includes: a connector that is cascade-connected to another KVM switch; an inputter that inputs a creation instruction of control data including control information which controls the operation of the another KVM switch; a creator that creates the control data having a data format that is the same as a data format of key code data inputted from the key board or the mouse when a creation instruction of the control data is inputted, the control data including the control information and a first identifier indicative of the control data; and an outputter that outputs the created control data to the another KVM switch.

9 Claims, 10 Drawing Sheets

(56) References Cited

U.S. PATENT DOCUMENTS

| | | | |
|---|---|---|---|
| 2009/0157921 A1* | 6/2009 | Lin | G06F 3/023 710/72 |
| 2010/0180055 A1* | 7/2010 | Lyon | G06F 3/023 710/62 |
| 2014/0075062 A1* | 3/2014 | Yasuno | G06F 3/023 710/62 |

* cited by examiner

FIG. 3

| USB ID | |
|---|---|
| VENDER ID | PRODUCT ID |
| 0430h | 042Fh |

FIG. 4

| KVM SWITCH JUDGING VERSION | VERSION OF MASTER KVM SWITCH | VERSION OF SLAVE KVM SWITCH |
|---|---|---|
| MASTER KVM SWITCH | -- | 0001h |
| SLAVE KVM SWITCH | 0001h | -- |

DATA FORMAT OF CONTROL DATA

KVM SWITCH

CROSS-REFERENCE TO RELATED APPLICATION

This application is based upon and claims the benefit of priority of the prior Japanese Patent Application No. 2014-219621 filed on Oct. 28, 2014, the entire contents of which are incorporated herein by reference.

FIELD

A certain aspect of the embodiments is related to a KVM switch.

BACKGROUND

Conventionally, there has been known a KVM (K: keyboard, V: video, M: mouse) switch that switches a plurality of computers when a console composed of a key board, a mouse and a monitor is shared between the plurality of computers (see Japanese Laid-open Patent Publication No. 2005-18135). The KVM switch can be cascade-connected to another KVM switch FIG. 1 is a system including a plurality of KVM switches cascade-connected to each other, a plurality of computers, and a keyboard and mouse. Here, in FIG. 1, elements relating to video data are omitted.

A system 10 illustrated in FIG. 1 includes computers 1 and 2, a master KVM switch 3, a slave KVM switch 4, and a keyboard and mouse 5. The computer 1 includes a USB port 1a that functions as a USB (Universal Serial Bus) host, and is connected to a USB port 3d of the master KVM switch 3 via a USB cable 6. The computer 2 includes a USB port 2a that functions as a USB (Universal Serial Bus) host, and is connected to a USB port 4d of the slave KVM switch 4 via a USB cable 7.

The master KVM switch 3 includes a USB port 3a that functions as a USB host, a controller 3b controlling the operation of the whole KVM switch 3, a switch 3c switching USB ports 3d to 3g, and the USB ports 3d to 3g that function as USB devices. The slave KVM switch 4 includes a USB port 4a that functions as a USB host, a controller 4b controlling the operation of the whole KVM switch, a switch 4c switching USB ports 4d to 4g, and the USB ports 4d to 4g that function as USB devices. The USB port 4a is connected to the USB port 3g via a USB cable 8. The keyboard and mouse 5 that functions as a USB device is connected to the USB port 3a of the master KVM switch 3 via a USB cable 9.

The keyboard and mouse 5 transmits key codes and mouse data to the master KVM switch 3 or the slave KVM switch 4.

SUMMARY

According to an aspect of the present invention, there is provided a KVM (K: keyboard, V: video, M: mouse) switch to be connected between a computer, and a keyboard and a mouse, the KVM switch including: a connector that is cascade-connected to another KVM switch; an inputter that inputs a creation instruction of control data including control information which controls the operation of the another KVM switch; a creator that creates the control data having a data format that is the same as a data format of key code data inputted from the key board or the mouse when a creation instruction of the control data is inputted, the control data including the control information and a first identifier indicative of the control data; and an outputter that outputs the created control data to the another KVM switch.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a USB ID;

FIG. 4 is a diagram illustrating an example of a correspondence table of KVM version information;

DESCRIPTION OF EMBODIMENTS

Figure 1:
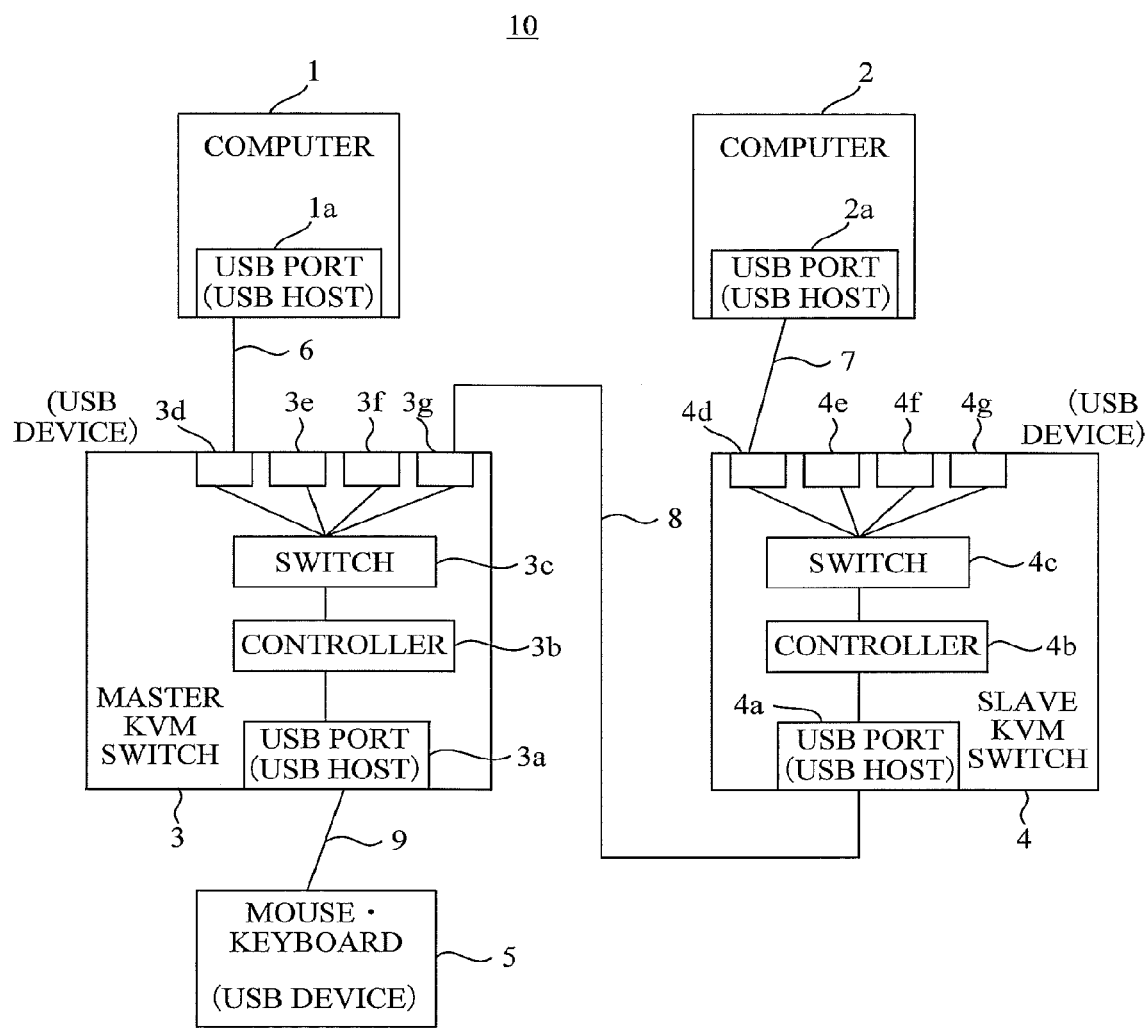
FIG. 1 is a system including a plurality of KVM switches cascade-connected to each other, a plurality of computers, and a keyboard and mouse.

In the above-mentioned system 10, when the master KVM switch 3 switches the USB ports 4d to 4g of the slave KVM switch 4, the master KVM switch 3 needs to transmit port information indicative of a source port and a destination port to the slave KVM switch 4.

However, in a USB standard, when a transmission instruction of the port information is not transmitted from the USB host to the USB device, the USB device cannot transmit the port information to the USB host. That is, when the transmission instruction of the port information is not transmitted from the USB port 4a of the slave KVM switch 4 to the USB port 3g of the master KVM switch 3, the USB port 3g cannot transmit the port information to the USB port 4a.

Therefore, it is considered that the slave KVM switch 4 periodically transmits a setup request of the USB to the master KVM switch 3 and the master KVM switch 3 transmit the port information as response data to the slave KVM switch 4.

However, when the slave KVM switch 4 periodically transmits the setup request of the USB to the master KVM switch 3, loads are applied to USB interfaces (i.e., the USB ports 4a and 3g), and depending on an issue interval between the setup requests of the USB, the transmission of the port information from the master KVM switch 3 may delay.

A description will now be given of a present embodiment with reference to the drawings.

Figure 2:
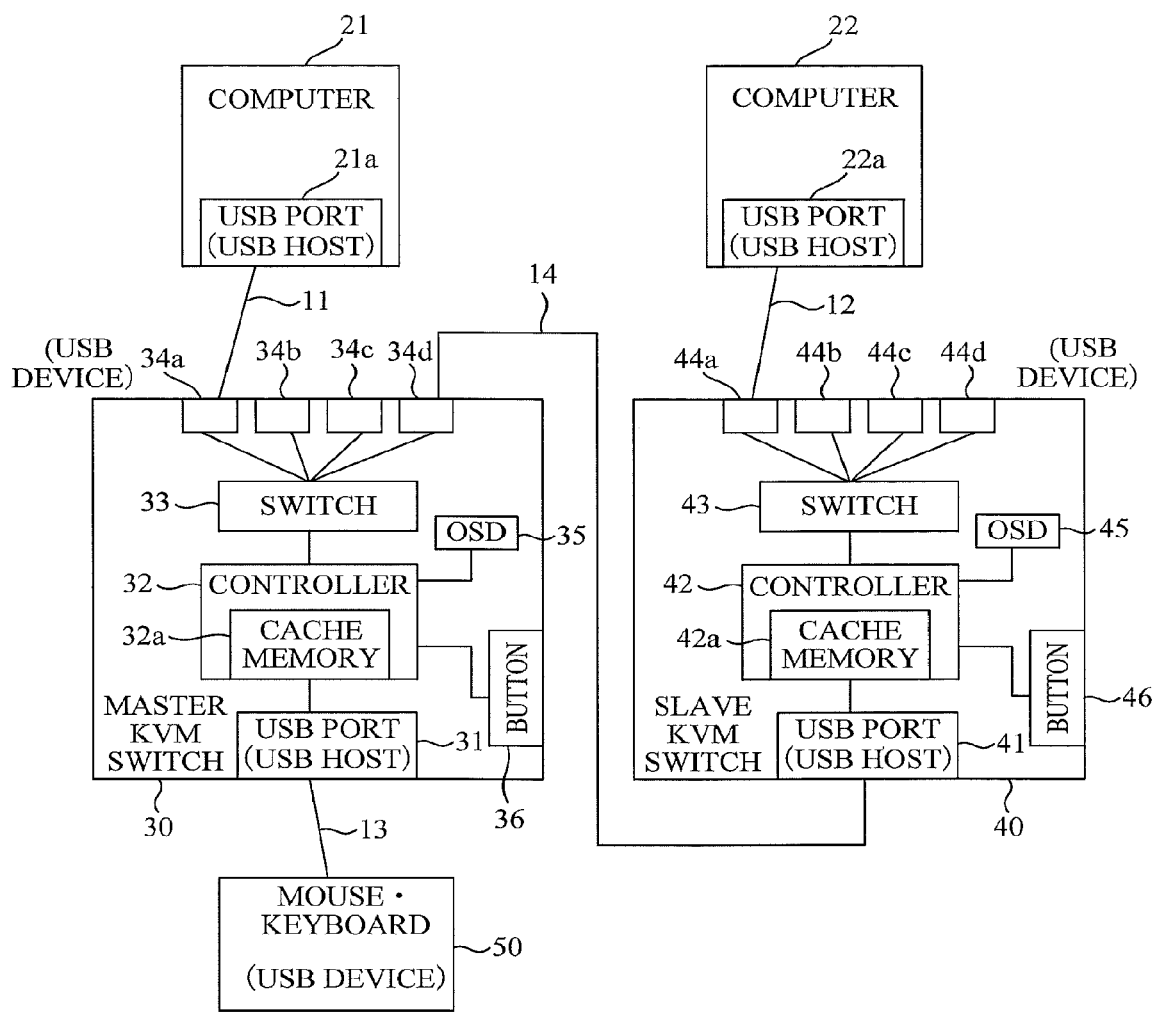
FIG. 2 is a diagram illustrating a configuration of a system including KVM (K: keyboard, V: video, M: mouse) switches according to a present embodiment.

FIG. 2 is a diagram illustrating a configuration of a system including KVM (K: keyboard, V: video, M: mouse) switches according to a present embodiment. In a system 100 illustrated in FIG. 2, the configuration of the KVM switches relating to video data, the configuration of computers, and monitors as consoles connected to KVM switches are omitted.

The system 100 illustrated in FIG. 2 includes computers 21 and 22, a master KVM switch 30, a slave KVM switch 40 and a keyboard and mouse 50. The number of computers connected to the master KVM switch 30 and the slave KVM switch 40 is not limited to one, and a plurality of computers may be connected to each of the master KVM switch 30 and the slave KVM switch 40.

The computer 21 includes a USB port 21a that functions as a USB (Universal Serial Bus) host, and is connected to a USB port 34a of the master KVM switch 30 via a USB cable 11. The computer 22 includes a USB port 22a that functions as a USB host, and is connected to a USB port 44a of the slave KVM switch 40 via a USB cable 12.

The master KVM switch 30 includes a USB port 31 that functions as a USB host, a controller 32 controlling the operation of the whole master KVM switch 30, a switch 33 switching USB ports 34a to 34d, and the USB ports 34a to 34d that are connectable to the computer 21 and the slave KVM switch 40 and function as USB devices. The USB port 4a is connected to the USB port 3g via a USB cable 8. The controller 32 functions an inputter, a creator, and a determiner. The USB ports 34a to 34d function as a connector and an outputter. Moreover, the master KVM switch 30 includes: an OSD controller 35 that displays, on a display, not shown, an OSD (On-Screen Display) for switching a USB port (e.g. any one of the USB ports 34a to 34d and 44a to 44d) to be connected to the computer or for setting various control information of the master KVM switch 30; and a button group 36 composed of a plurality of buttons for switching a USB port (e.g. any one of the USB ports 34a to 34d and 44a to 44d) to be connected to the computer.

The controller 32 is connected to the USB port 31, the switch 33, the OSD controller 35 and the button group 36. Moreover, the switch 33 is connected to the USB ports 34a to 34d. The controller 32 includes a cache memory 32a.

The slave KVM switch 40 includes a USB port 41 that functions as a USB host, a controller 42 controlling the operation of the whole slave KVM switch 40, a switch 43 switching USB ports 44a to 44d, and the USB ports 44a to 44d that are connectable to the computer 22 and function as USB devices. The USB port 41 functions as a connector. The controller 42 functions as a receiver, a controller, a first judger, and a second judger. Moreover, the slave KMV switch 40 includes: an OSD controller 45 that displays, on a display, not shown, an OSD (On-Screen Display) for switching a USB port (e.g. any one of the USB ports 44a to 44d) to be connected to the computer or for setting various control information of the slave KVM switch 40; and a button group 46 composed of a plurality of buttons for switching a USB port (e.g. any one of the USB ports 34a to 34d and 44a to 44d) to be connected to the computer.

The controller 42 is connected to the USB port 41, the switch 43, the OSD controller 45 and the button group 46. Moreover, the switch 43 is connected to the USB ports 44a to 44d. The controller 42 includes a cache memory 42a.

The USB port 41 is connected to the USB port 34d via the USB cable 14. Here, the USB port 41 may be connected to either of the USB ports 34a to 34c via the USB cable 14. The keyboard and mouse 50 that functions as the USB device is connected to the USB port 31 of the master KVM switch 30.

The keyboard and mouse 50 transmits the control information of the master KVM switch 30 and the slave KVM switch 40 to the master KVM switch 30 in addition to the key codes. The control information includes: a command for the master KVM switch 30 to switch the USB ports 44a to 44d of the slave KVM switch 40; a command for the master KVM switch 30 to switch the USB ports 34a to 34d; a command (an auto scan command) to switch a plurality of computers connected to the master KVM switch 30 and the slave KVM switch 40 sequentially, and to monitor the operation of each computer; and a reset start command to instruct reset to the slave KVM switch 40.

Since the master KVM switch 30 and the slave KVM switch 40 have the same configuration substantially, the master KVM switch 30 can be used as the slave KVM switch, and the slave KVM switch 40 can be used as the master KVM switch. The setting of the master or the slave to each KVM switch is read out by the OSD controller 35, and is performed on the OSD.

Figure 3:
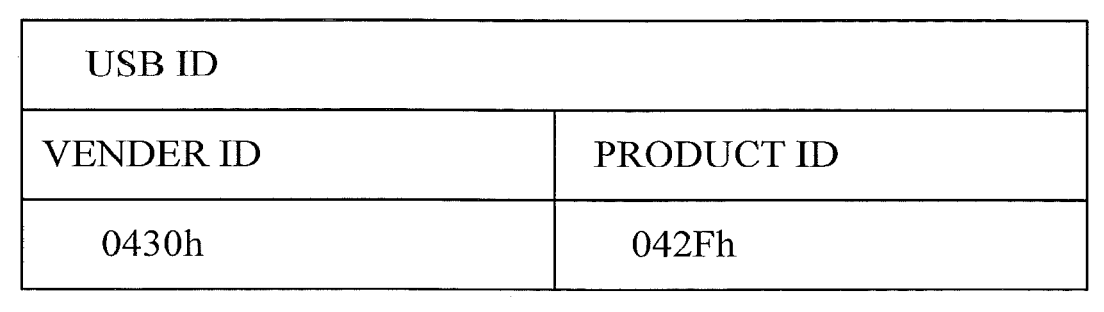

Here, each of the cache memories 32a and 42a includes a USB ID illustrated in FIG. 3 and a correspondence table of KVM version information illustrated in FIG. 4. FIG. 3 is a diagram illustrating an example of the USB ID. FIG. 4 is a diagram illustrating an example of the correspondence table of the KVM version information.

As illustrated in FIG. 3, the USB ID includes a vender ID and a product ID. The vender ID is an identifier that identify a vender of the KVM switch, and the product ID is an identifier that identify a kind of the KVM switch. The USB ID is used by the controller 42 of the slave KVM switch 40 in order to judge whether the master KVM switch 30 has a cascade connection function. Specifically, when the master KVM switch 30 and the slave KVM switch 40 are USB-connected with each other, the controller 42 of the slave KVM switch 40 acquires the USB ID from the master KVM switch 30. Then, when the acquired USB ID is identical with a USB ID stored in the cache memory 42a, the controller 42 judges that the master KVM switch 30 has the cascade connection function. When the acquired USB ID is not identical with the USB ID stored in the cache memory 42a, the controller 42 judges that the master KVM switch 30 does not have the cascade connection function.

In the present embodiment, each of the cache memories 32a and 42a includes KVM version information (e.g. "0001h") of a self KVM switch. The KVM version information is information indicative of the KVM switch corresponding to the cascade connection.

The correspondence table of the KVM version information of FIG. 4 denotes that the master KVM switch 30 confirms the KVM version information of the slave KVM switch 40 and the slave KVM switch 40 confirms the master KVM switch 30. That is, the master KVM switch 30 acquires the KVM version information of the slave KVM switch 40. When the acquired KVM version information is identical with the KVM version information of the slave KVM switch 40 described in the correspondence table, the master KVM switch 30 judges that the slave KVM switch 40 is a KVM switch corresponding to the cascade connection. When the acquired KVM version information is not identical with the KVM version information of the slave KVM switch 40 described in the correspondence table, the master KVM switch 30 judges that the slave KVM switch 40 is not the KVM switch corresponding to the cascade connection.

The slave KVM switch 40 acquires the KVM version information of the master KVM switch 30. When the acquired KVM version information is identical with the KVM version information of the master KVM switch 30 described in the correspondence table, the slave KVM switch 40 judges that the master KVM switch 30 is a KVM switch corresponding to the cascade connection. When the acquired KVM version information is not identical with the KVM version information of the master KVM switch 30 described in the correspondence table, the slave KVM switch 40 judges that the master KVM switch 30 is not the KVM switch corresponding to the cascade connection.

Figure 5:
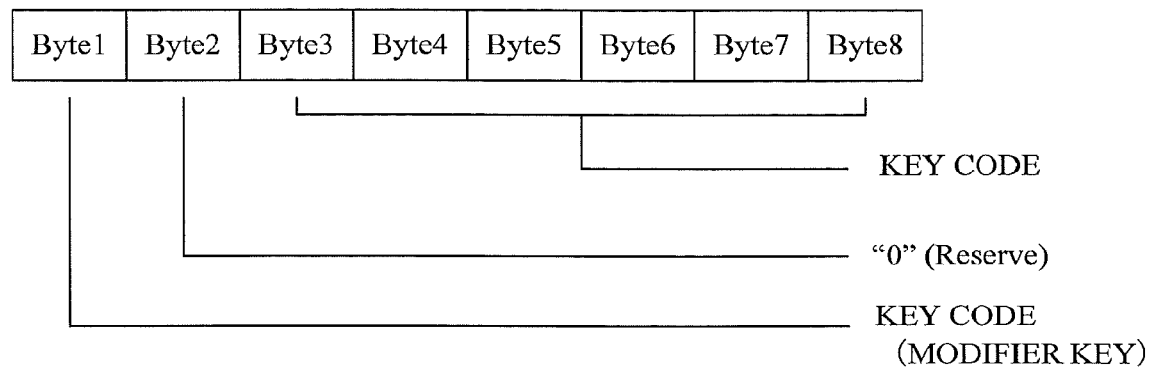
FIG. 5 is a diagram illustrating a data format of a key code for USB.

FIG. 5 is a diagram illustrating a data format of the key code data for USB.

The key code data is inputted from the keyboard or the mouse to the master KVM switch 30, and composed of 8 bytes. Information on a modifier key, such as a "Shift" key or a "Ctrl" key, is set to a first byte. The key codes of number keys and alphabet keys are set to third to eighth bytes. A second byte is a domain for reserve and is fixedly set to "0". The "0" inputted to the second byte functions as an identifier of the key code data, as mentioned later. In the present embodiment, data inputted from the mouse and data inputted from the keyboard have the same data format, and are explained as the key code data.

Figure 6:
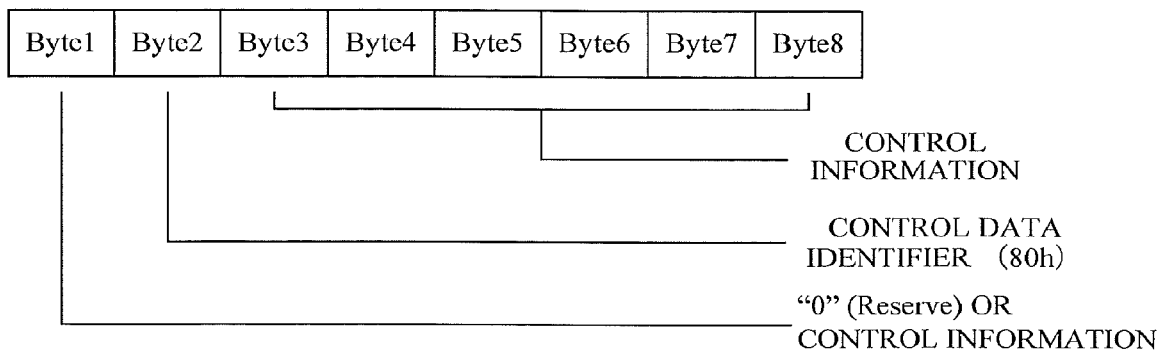
FIG. 6 is a diagram illustrating a data format of control data of a master KVM switch and a slave KVM switch.

FIG. 6 is a diagram illustrating a data format of control data of the master KVM switch 30 and the slave KVM switch 40.

The control data of the master KVM switch 30 and the slave KVM switch 40 is composed of 8 bytes like the key code data. A first byte is a domain for reserve and is fixedly set to "0", or control information is set to the first byte. A "80h" as a control data identifier indicating the control data is set to a second byte. The control information of the master KVM switch 30 and the slave KVM switch 40 is set to third to eighth bytes.

When the OSD for setting the control information is started or a button in the button group 36 or 46 for switching the USB port (e.g. any one of the USB ports 34a to 34d or 44a to 44d) to be connected to the computer is depressed, the control data of the master KVM switch 30 or the slave KVM switch 40 is created by the controller 32 or 42. Here, in the present embodiment, since the master KVM switch 30 is cascade-connected to the slave KVM switch 40, and the keyboard and the mouse are not connected to the slave KVM switch 40, the control data is created by the controller 32. When the keyboard and the mouse are connected to the slave KVM switch 40 (e.g. when the slave KVM switch 40 is used alone or functions as a master KVM switch), the controller 42 creates the control data.

Figure 7A:
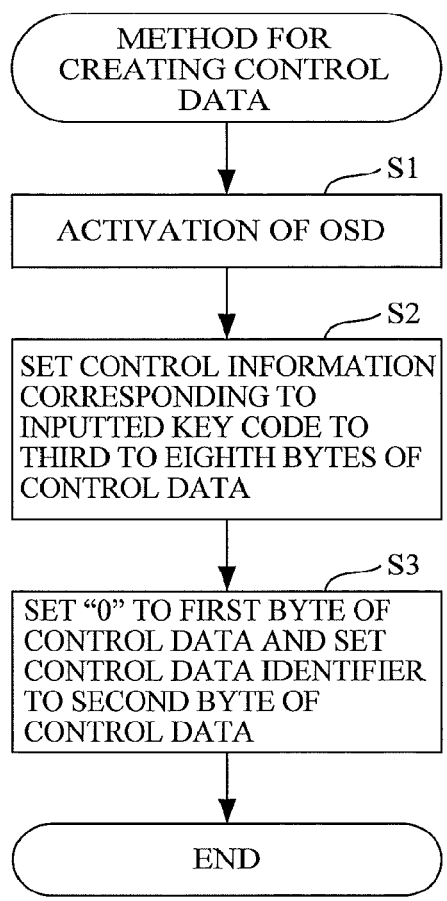
FIG. 7A is a flowchart illustrating a method for creating the control data by starting an OSD (On-Screen Display)
Figure 7B:
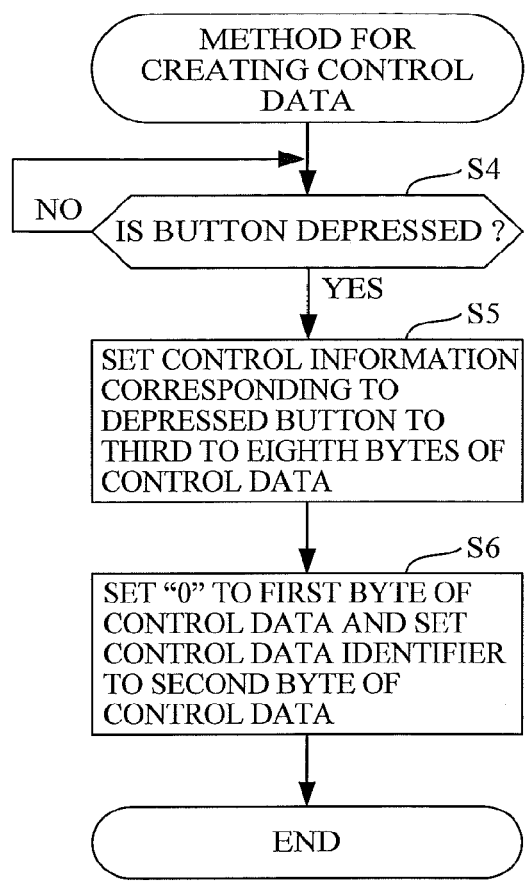
FIG. 7B is a flowchart illustrating a method for creating the control data by depressing a button in a button group.

Here, a description will be given of a method in which the controller 32 creates the control data. FIG. 7A is a flowchart illustrating a method for creating the control data by starting the OSD. FIG. 7B is a flowchart illustrating a method for creating the control data by depressing a button in the button group 36.

In FIG. 7A, when a prescribed hot key (e.g. a function key and a "1" key) is inputted, the controller 32 activates the OSD with the OSD controller 35 (step S1). When an operator inputs the key code with the keyboard and mouse 50, the controller 32 newly creates the control data. In this case, the controller 32 sets the control information corresponding to the inputted key code to the third to eighth bytes of the control data (step S2), sets "0" to the first byte of the control data and sets the control data identifier to the second byte of the control data (step S3). Thereby, the creation of the control data is completed.

On the other hand, when any one in the button group 36 is depressed (YES in step S4), the controller 32 newly creates the control data. In this case, the controller 32 sets the control information corresponding to the depressed button to the third to eighth bytes of the control data (step S5), sets "0" to the first byte of the control data and sets the control data identifier to the second byte of the control data (step S6). Thereby, the creation of the control data is completed.

Thus, in the present embodiment, the data format of the control data is made the same as the data format of the key code data, and the data format of the key code data is used for the transmission of the control information from the master KVM switch 30. Thereby, the controller 42 of the slave KVM switch 40 can receive the control data in the same manner as the key code data, and hence the slave KVM switch 40 does not have to periodically transmit the setup request of the USB to the master KVM switch 30 as before.

Here, it is considered not to make the data format of the control data same as the data format of the key code data. A method that adds the control information to the key code data from the keyboard and mouse 50 is considered as a vendor definition of the USB, for example.

In this case, since a report descriptor indicating the data constitution of the USB includes the control information of the vendor definition, the keyboard and mouse 50 may not work in BIOS (Basic Input/Output System) setup of the computer 21 and 22. That is, when the data format of the control data is not made the same as the data format of the key code data, a malfunction may occur by the operation of the computers 21 and 22. Therefore, by making the data format of the control data the same as the data format of the key code data, the occurrence of the malfunction by the operation of the computer 21 and 22 can be avoided.

When the control information is a command for controlling the operation of the slave KVM switch 40 (e.g. a command for switching any one of the USB ports 44a to 44d of the slave KVM switch 40), the control data is transmitted from the master KVM switch 30 to the slave KVM switch 40 after the cascade connection between the master KVM switch 30 and the slave KVM switch 40 is established.

When the slave KVM switch 40 receives the 8 byte data from the master KVM switch 30, the controller 42 judges whether the second byte of the received data is "0" or the control data identifier (80h). Thereby, the controller 42 can judge which of the key code data or the control data is transmitted from the master KVM switch 30.

When the second byte of the data received from the master KVM switch 30 is the control data identifier, the controller 42 confirms the control information in the first byte and/or the third to eighth bytes of the received data. When the control information is a command for switching from the USB port 44a to the USB port 44b, for example, the controller 42 performs a process that switches from the USB port 44a to the USB port 44b, i.e., controls the switch 43 so as to switch from the USB port 44a to the USB port 44b.

Figure 8:
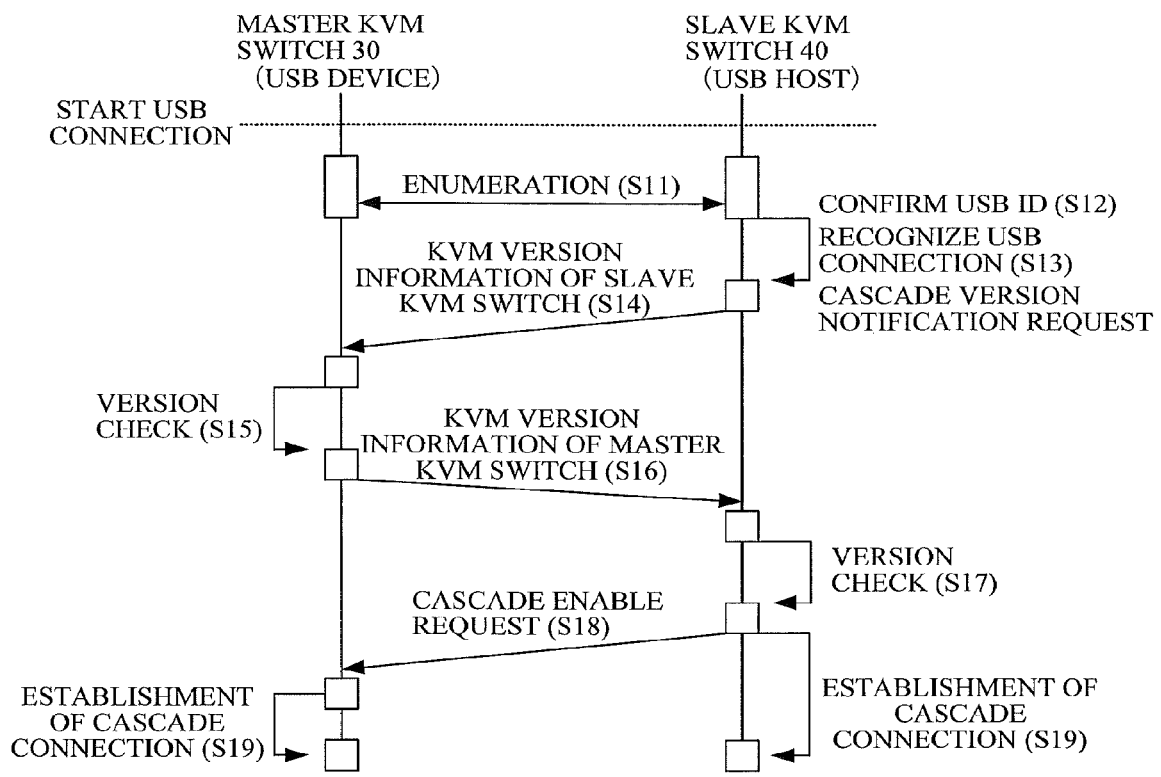
FIG. 8 is a sequence diagram illustrating a process establishing a cascade connection between the master KVM switch and the slave KVM switch.

FIG. 8 is a sequence diagram illustrating a process establishing the cascade connection between the master KVM switch 30 and the slave KVM switch 40.

When the master KVM switch 30 is USB-connected to the slave KVM switch 40, the USB port 41 (i.e., the USB host) of the slave KVM switch 40 performs an enumeration process on the USB port 34d (i.e., the USB device) of the master KVM switch 30 (step S11). In the enumeration process, the USB ID indicating what kind of USB apparatus an apparatus at the USB device side (here, the master KVM switch 30) is, is transmitted to an apparatus at the USB host side (here, the slave KVM switch 40).

The controller 42 judges whether the USB ID of the master KVM switch 30 is identical with the USB ID of a KVM switch having the cascade connection function (step S12). The USB ID of the KVM switch having the cascade connection function is stored beforehand in the cache memory 42a. When the USB ID of the master KVM switch 30 is identical with the USB ID of the KVM switch having the cascade connection function, the controller 42 recognizes the USB connection (step S13). When the USB ID of the master KVM switch 30 is not identical with the USB ID of the KVM switch having the cascade connection function, the controller 42 does not recognizes the USB connection, and hence cancels the process establishing the cascade connection. When the USB ID of the master KVM switch 30 is identical with the USB ID of the KVM switch having the cascade connection function, the controller 42 transmits a cascade version notification request (GET_CASCADE_VERSION) including the KVM version information of the slave KVM switch 40 to the controller 32 of the master KVM switch 30 (step S14).

When the controller 32 receives the cascade version notification request, the controller 32 judges whether the KVM version information of the slave KVM switch 40 included in the cascade version notification request is identical with the KVM version information of the slave KVM switch 40 described in the correspondence table of FIG. 4 (step S15). When the KVM version information of the slave KVM switch 40 included in the cascade version notification request is identical with the KVM version information of the slave KVM switch 40 described in the correspondence table of FIG. 4, the controller 32 returns the KVM version information of the master KVM switch 30 to the slave KVM switch 40 (step S16).

When the controller 42 receives the KVM version information of the master KVM switch 30, the controller 42 judges whether the received KVM version information of the master KVM switch 30 is identical with the KVM version information of the master KVM switch 30 described in the correspondence table of FIG. 4 (step S17). When the received KVM version information of the master KVM switch 30 is identical with the KVM version information of the master KVM switch 30 described in the correspondence table of FIG. 4, the controller 42 returns a cascade enable request (SET_CASCADE_ENABLE) to the master KVM switch 30 (step S18). The controller 32 receives the cascade enable request, and establishes the cascade connection with the controller 42 of the slave KVM switch 40 (step S19).

After the cascade connection is established, the control data of the slave KVM switch 40 is transmitted from the controller 32 of the master KVM switch 30 to the controller 42 of the slave KVM switch 40.

Figure 9:
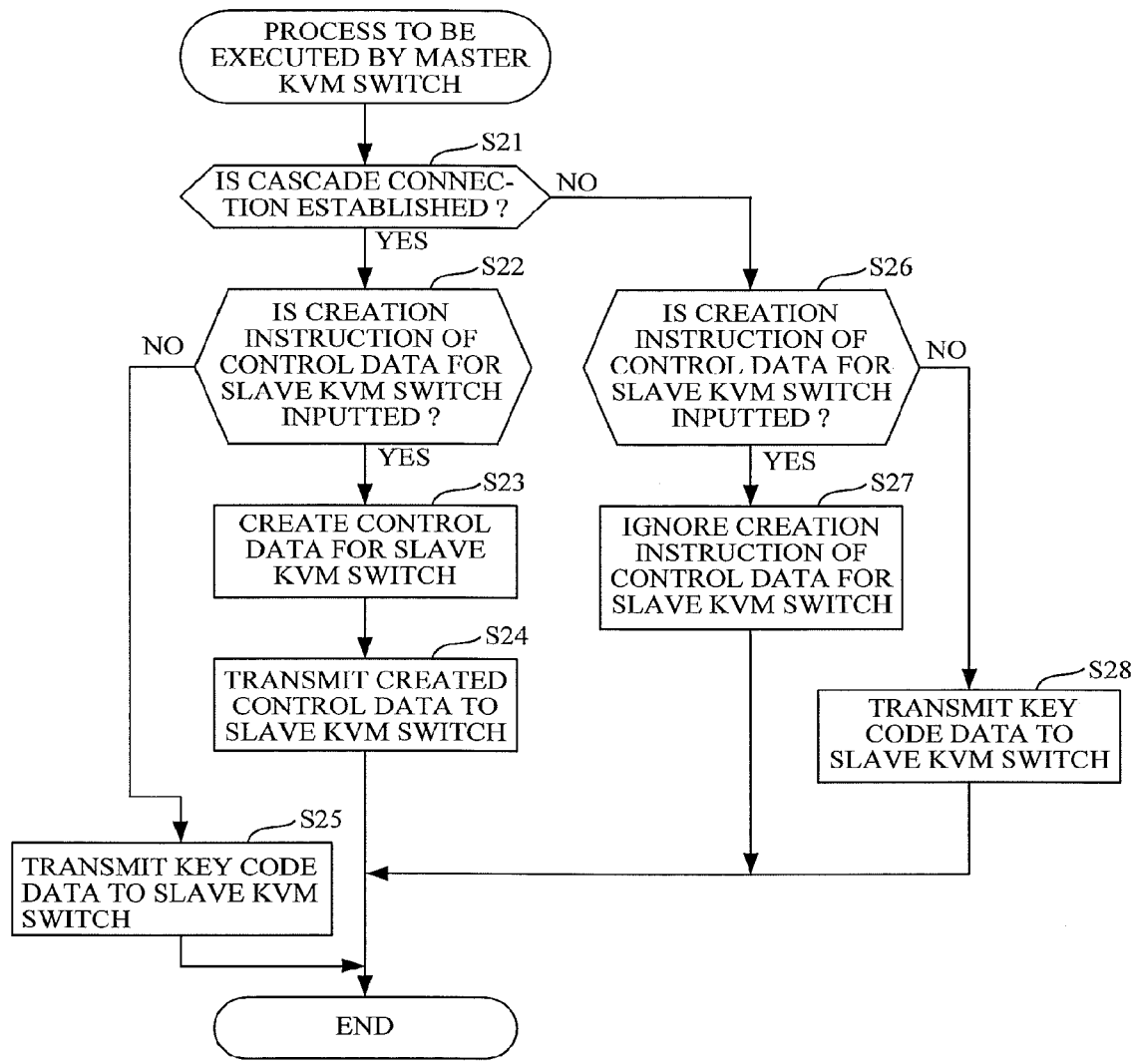
FIG. 9 is a flowchart illustrating a process to be executed by the master KVM switch.

FIG. 9 is a flowchart illustrating a process to be executed by the master KVM switch 30.

First, the controller 32 of the master KVM switch 30 judges whether the cascade connection is established (step S21). As described above, the controller 32 receives the cascade enable request from the slave KVM switch 40 (step S18 of FIG. 8), and therefore the controller 32 can judge whether the cascade connection is established based on whether the master KVM switch 30 receives the cascade enable request.

When the cascade connection is established (YES in step S21), the controller 32 judges whether a creation instruction of the control data for the slave KVM switch 40 is inputted (step S22). Since the control data for the slave KVM switch 40 is created by the input of the control data in the OSD or the depression of the button in the button group 36, here, the controller 32 performs the judgment of step S22 by monitoring the input of the control data in the OSD or the depression of the button in the button group 36.

When the creation instruction of the control data for the slave KVM switch 40 is inputted (YES in step S22), the controller 32 creates the control data for the slave KVM switch 40 based on the key code data inputted from the keyboard and mouse 50 or the depression of the button in the button group 36 (step S23). Here, a concrete creation method of the control data for the slave KVM switch 40 is based on FIG. 7A or 7B. Then, the controller 32 transmits the created control data to the controller 42 of the slave KVM switch 40 (step S24). The present process is terminated.

When the creation instruction of the control data for the slave KVM switch 40 is not inputted (NO in step S22), the controller 32 transmits the key code data inputted from the keyboard and mouse 50 to the controller 42 of the slave KVM switch 40 (step S25). The present process is terminated.

When the cascade connection is not established (NO in step S21), the controller 32 judges whether a creation instruction of the control data for the slave KVM switch 40 is inputted (step S26). When the creation instruction of the control data for the slave KVM switch 40 is inputted (YES in step S26), the controller 32 ignores the creation instruction of the control data for the slave KVM switch 40 (step S27). The present process is terminated. In this case, the USB connection is established but the cascade connection is not established. Therefore, even if the controller 32 transmits the control data for the slave KVM switch 40 to the controller 42, the controller 42 misrecognizes the control data for the slave KVM switch 40 from the controller 32 as the key code data. This is a reason why the controller 32 ignores the creation instruction of the control data in step S27.

When the creation instruction of the control data for the slave KVM switch 40 is not inputted (NO in step S26), the controller 32 transmits the key code data inputted from the keyboard and mouse 50 to the controller 42 of the slave KVM switch 40 (step S28). The present process is terminated.

Figure 10:
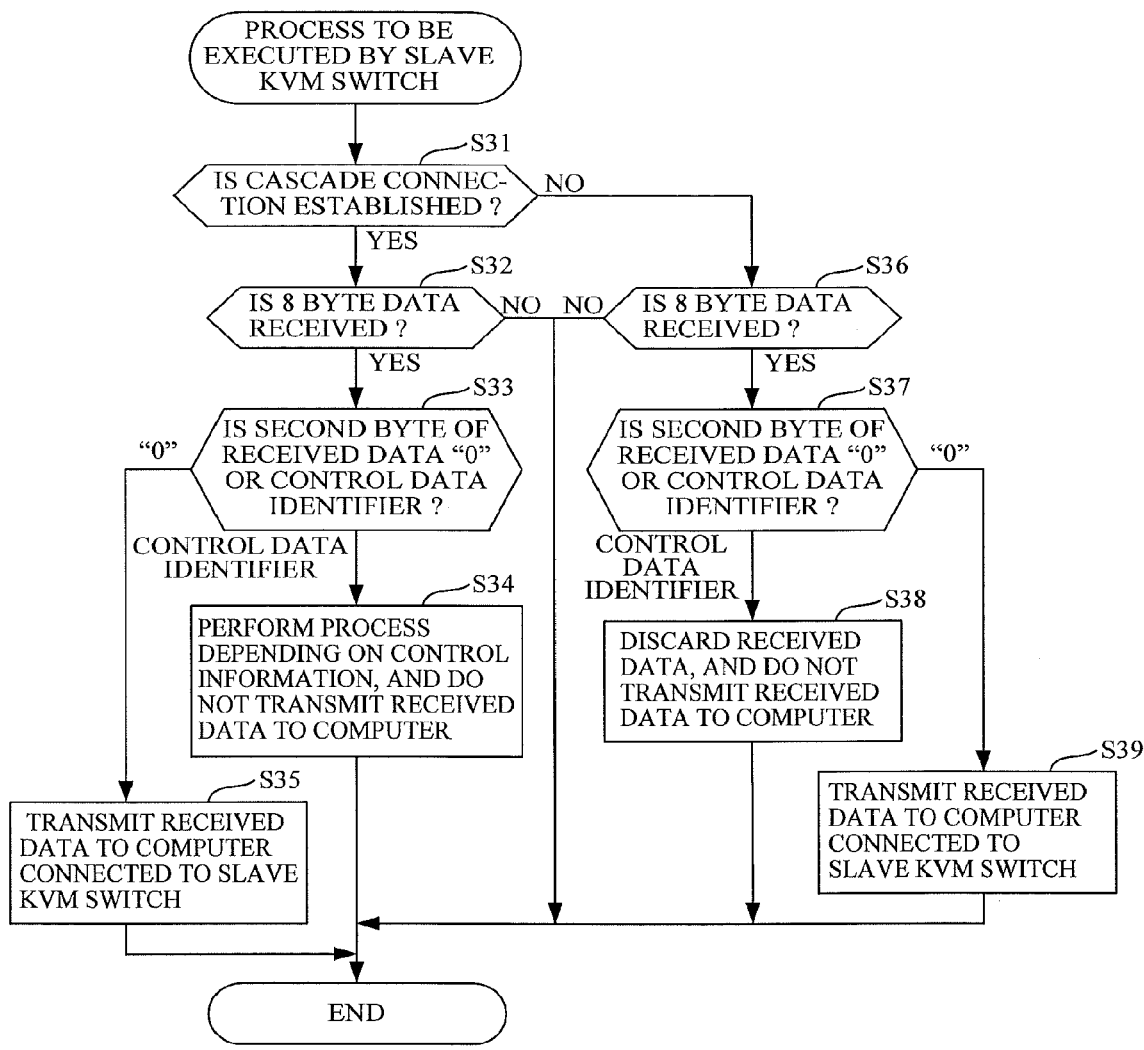
FIG. 10 is a flowchart illustrating a process to be executed by the slave KVM switch.

FIG. 10 is a flowchart illustrating a process to be executed by the slave KVM switch 40.

First, the controller 42 of the slave KVM switch 40 judges whether the cascade connection is established (step S31). Since the controller 42 transmits the cascade enable request to the master KVM switch 30 before the cascade connection is established (step S18 of FIG. 8) as described above, the controller 42 can judge whether the cascade connection is established based on whether the controller 42 has transmitted the cascade enable request to the master KVM switch 30.

When the cascade connection is established (YES in step S31), the controller 42 judges whether the 8 byte data is received from the master KVM switch 30 (step S32). When the 8 byte data is not received from the master KVM switch 30 (NO in step S32), the present process is terminated. On the other hand, when the 8 byte data is received from the master KVM switch 30 (YES in step S32), the controller 42 judges whether the second byte of the received data is "0" or the control data identifier (80h) (step S33). Here, the controller 42 judges which of the key code data or the control data is transmitted from the master KVM switch 30.

When the second byte of the data received from the master KVM switch 30 is the control data identifier in step S33, the controller 42 performs a process depending on the control information in the first byte and/or the third to eighth bytes of the received data, and does not transmit the received data to the computer connected to the slave KVM switch 40

(step S34). In this case, the received data is the control data for the slave KVM switch 40. Therefore, when the received data is transmitted to the computer connected to the slave KVM switch 40, the computer causes malfunction. This is a reason why the controller 42 does not transmit the received data to the computer connected to the slave KVM switch 40 in step S34.

When the second byte of the data received from the master KVM switch 30 is "0" in step S33, the controller 42 transmits the received data to the computer connected to the slave KVM switch 40 (step S35). The present process is terminated.

When the cascade connection is not established (NO in step S31), the controller 42 judges whether the 8 byte data is received from the master KVM switch 30 (step S36). When the 8 byte data is not received from the master KVM switch 30 (NO in step S36), the present process is terminated.

When the 8 byte data is received from the master KVM switch 30 (YES in step S36), the controller 42 judges whether the second byte of the received data is "0" or the control data identifier (80h) (step S37).

When the second byte of the data received from the master KVM switch 30 is the control data identifier in step S37, the controller 42 discards the received data as invalid control data, and does not transmit the received data to the computer connected to the slave KVM switch 40 (step S38). This is because the slave KVM switch 40 cannot process the received data since the cascade connection is not established. Moreover, this is because the computer connected to the slave KVM switch 40 causes malfunction when the received data is transmitted to the computer.

When the second byte of the data received from the master KVM switch 30 is "0" in step S37, the controller 42 transmits the received data to the computer connected to the slave KVM switch 40 (step S39). The present process is terminated.

In the above-mentioned embodiment, the USB interface is used as an interface between the master KVM switch 30 and the slave KVM switch 40. Alternatively, an interface having a master/slave relationship, such as I2C (HID Over I2C), also can be used.

As described above, according to the present embodiment, the controller 32 of the master KVM switch 30 make the data format of the control data the same as the data format of the key code data, and uses the data format of the key code data for the transmission of the control information from the master KVM switch 30. Thereby, the controller 42 of the slave KVM switch 40 can receive the control data in the same manner as the key code data, and hence the slave KVM switch 40 does not have to periodically transmit the setup request of the USB to the master KVM switch 30 as before.

Also in the present embodiment, an exclusive USB port (USB device) transmitting the control data of the slave KVM switch 40 does not have to be provided newly in the master KVM switch 3 and the slave KVM switch 4. Moreover, a controller for supporting many USB devices does not have to be provided newly in the master KVM switch 3 and the slave KVM switch 4. Therefore, the manufacturing cost of the master KVM switch 3 and the slave KVM switch 4 can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A KVM (K: keyboard, V: video, M: mouse) switch to be connected between a computer, and a keyboard and a mouse, the KVM switch comprising:
   a connector that is connected to another KVM switch;
   a judger that judges whether a cascade connection with the another KVM switch is established;
   an inputter that inputs a creation instruction of control data including control information which controls operation of the another KVM switch;
   a creator that creates the control data having a data format that is the same as a data format of key code data inputted from the key board or the mouse when the judger judges that the cascade connection with the another KVM switch is established and the inputter inputs the creation instruction of the control data, the control data including the control information and an identifier indicative of the control data; and
   an outputter that outputs the created control data to the another KVM switch.

2. The KVM switch as claimed in claim 1,
   wherein when the cascade connection with the another KVM switch is not established, the creator creates no control data.

3. The KVM switch as claimed in claim 1, wherein
   when an OSD (On-Screen Display) is activated as the creation instruction of the control data, the creator creates the identifier and control information corresponding to a key code included in the key code data inputted from the key board or the mouse.

4. The KVM switch as claimed in claim 1, comprising:
   a button that switches a computer of an operation object, the computer being connected to the another KVM switch;
   wherein when the button is depressed as the creation instruction of the control data, the creator creates the identifier and control information corresponding to the depressed button.

5. The KVM switch as claimed in claim 2, wherein
   when a USB (Universal Serial Bus) connection with the another KVM switch is established, the judger judges whether the cascade connection with the another KVM switch is established.

6. A KVM (K: keyboard, V: video, M: mouse) switch to be connected between a computer and another KVM switch, the KVM switch comprising:
   a connector that is connected to the another KVM switch;
   a receiver that receives key code data inputted from a keyboard or a mouse which is connected to the another KVM switch, and control data having a data format that is the same as a data format of the key code data and including control information controlling operation of the another KVM switch; and
   a controller that judges whether a cascade connection with the another KVM switch is established, when the cascade connection with the another KVM switch is established and data received from the another KVM switch is the control data, performs a process depending on the control information, and when the cascade connection with the another KVM switch is not established and the data received from the another KVM switch is the control data, discards the data received from the another KVM switch.

7. The KVM switch as claimed in claim 6, wherein when the data received from the another KVM switch is the key code data, the controller transmits the key code data to the computer, and when data received from the another KVM switch is the control data, the controller transmits no control data to the computer.

8. The KVM switch as claimed in claim 6, wherein the control data includes the control information and a first identifier indicative of the control data, the key code data includes a key code and a second identifier indicative of the key code data, and the KVM switch further comprises a first judger that judges whether the data received from the another KVM switch is the control data or the key code data, based on the first identifier and the second identifier.

9. The KVM switch as claimed in claim 6, wherein the controller judges whether the cascade connection with the another KVM switch is established, based on a given request received from the another KVM switch.

* * * * *